United States Patent [19]

Augustine et al.

[11] Patent Number: 4,761,292

[45] Date of Patent: Aug. 2, 1988

[54] READY-TO-SPREAD CAKE FROSTING

[75] Inventors: Michael E. Augustine; Donald W. Lillard, both of Decatur, Ill.

[73] Assignee: Staley Continental, Inc., Rolling Meadows, Ill.

[21] Appl. No.: 883,209

[22] Filed: Jul. 8, 1986

[51] Int. Cl.$^4$ .......................... A23G 3/00; A23L 3/00
[52] U.S. Cl. .................................. 426/321; 426/659; 426/572; 426/578; 426/613
[58] Field of Search ............... 426/572, 613, 659, 661, 426/578, 321

[56] References Cited

U.S. PATENT DOCUMENTS 4,146,652  3/1979  Kabu et al. ..................... 426/572
4,465,702  8/1984  Eastman et al. ................. 426/661

FOREIGN PATENT DOCUMENTS 899340  5/1972  Canada ........................... 426/572

OTHER PUBLICATIONS

Abstract of U.S. Pat. No. 4,707,374 (King et al.), Full Patent Considered 2-11-88.

*Primary Examiner*—Jeanette Hunter
*Attorney, Agent, or Firm*—Michael F. Campbell; James B. Guffey; J. Daniel Wood

[57] ABSTRACT

A storage-stable ready-to-spread cake frosting contains: (a) about 40 to 85 weight percent sugar, at least about 20 weight percent of which comprises fructose; (b) about 1 to 12 weight percent of a granular starch having a cold-water-solubility of greater than 50 weight percent and a fat content of less than 0.25 weight percent; (c) about 5 to 30 weight percent fat; and (d) about 10 to 30 weight percent water.

19 Claims, No Drawings

READY-TO-SPREAD CAKE FROSTING

FIELD OF THE INVENTION

This invention relates to cake frostings. More particularly, this invention relates to storage-stable, ready-to-spread cake frostings.

BACKGROUND OF THE INVENTION

Cake frostings made primarily of powdered sucrose and milk or, alternatively, powdered sucrose, water, and butter, are well known to bakers and consumers of cakes the world round. Other fats, such as margarine and shortening, are often substituted for the butter and various other ingredients, including eggs, flavorings, colorings, and emulsifiers, are commonly used. These frostings are prepared by vigorously mixing together the ingredients. After preparation, the homogeneous and aerated frosting is immediately spread upon the exposed surface of the cake. In addition to providing enhanced taste and eye appeal to the cake, the frosting helps reduce the tendency of the cake to dry out.

The organoleptic properties of these frostings are well known. Initially, their texture is smooth; their consistency is short (as opposed to stringy); their viscosity is such that the frostings are easily spreadable, but do not flow or "run" on the cake; and their density is only about one gram per cubic centimeter due to their high level of aeration. The organoleptic properties of these frostings change over time when exposed to ambient air. The frostings dry (i.e., lose water), harden, and (as the sucrose crystallizes) become grainier in texture. The frostings also lose their aeration so that their density increases and their initially-smooth appearance becomes jagged. The change in properties over time of these frostings is so well known and accepted that it is not often considered a disadvantage. However, if given a choice, a frosting which maintained its original organoleptic properties would be preferred.

There is nothing particularly difficult about preparing a frosting, but it does take effort in obtaining the ingredients, mixing them, and then cleaning up the utensils. Accordingly, there is a demand for "ready-to-spread" frostings which can be stored at room temperature for long periods of time and then be applied directly from a container to a cake without mixing.

Conventional cake frostings are not suitable for use as ready-to-spread frostings because they are prone to rapid microbial spoilage due to the presence of dairy ingredients and because of their tendency to deaerate and otherwise lose their initial physical properties. Commercial storage-stable ready-to-spread frostings first appeared about 25 years ago. To minimize microbial spoilage and thereby extend shelf life, these frostings generally eliminated dairy ingredients and added various preservatives (e.g., citric acid, sorbic acid, potassium sorbate, and sodium benzoate). Even without dairy ingredients, preservatives were needed because these frostings had relatively high water activities which provided a good environment for the growth of microorganisms such as bacteria, yeasts, and molds. Water activity is the ratio of the vapor pressure of water in a material to the vapor pressure of pure water at the same temperature. It is well known that microorganisms have limits on their ability to prevent the loss of water from their cells. If the water activity of their environment is too low, the cells cannot regulate the water loss and either become dormant or die. For example, few bacteria can survive at water activities less than about 0.85, few yeasts can survive at activities less than about 0.80, and few molds can survive at activities less than about 0.71. Many different ready-to-spread cake frostings have been formulated in an attempt to create a frosting which would match the organoleptic properties of conventional frostings and which would maintain these properties upon storage.

Bedenk, U.S. Pat. No. 3,194,666, issued July 13, 1965, and Bedenk U.S. Pat. No. 3,253,928, issued May 31, 1966, disclose storage-stable ready-to-spread frostings which comprise about 45 to 75 weight percent sucrose, about 10 to 25 weight percent water, and about 5 to 30 weight percent of a particular shortening blend of partially hydrogenated glycoside base stock and substantially completely hydrogenated triglyceride hardstock.

Wahba, U.S. Pat. No. 3,464,830, issued Sept. 2, 1969, discloses a storage-stable ready-to-spread frosting having a small amount of an alkali metal pyrophosphate to improve color retention. Wahba discusses various techniques which have been used to produce storage-stable ready-to-spread frostings, e.g., subjecting the blend of sucrose, water, and shortening to high shear or including in the frosting an emulsifier and/or pregelatinized starch or cold water soluble pectin to act as bodying agents.

Daggy, U.S. Pat. No. 3,649,302, issued Mar. 14, 1972, discloses yet another storage-stable ready-to-spread frosting. The Daggy frosting has two components: about 55 to 85 weight percent of a "comminuted sugar phase" and 15 to 45 weight percent of a "glyceridic-oil-phase-in-aqueous-phase emulsion". The former comprises 45 to 70 weight percent sucrose and 30 to 55 weight percent dextrose. The latter comprises a glyceridic oil such as margarine oil, shortening, or butter oil; water; and emulsifier; and a cold-water-swelling starch or cellulose.

Blake, U.S. Pat. No. 4,232,049, issued Nov. 4, 1980, discloses a frosting which is substantially fat-free but which allegedly has the rich mouthfeel of creme frostings and the lightness of fluffy frostings. The frosting comprises: (a) about 90 to 98 percent of a "comestible base"; (b) about 0.4 to 3 percent of a whipping agent, such as the protein hydrolyzates sold by the A. E. Staley Manufacturing Company; and (c) about 0.1 to 0.5 percent of a polysaccharide gum such as guar gum, locust bean gum, and xanthan gum. The "comestible base" is prepared by cooking a blend of: (1) about 25 to 65 percent citrus juice vesicles; (2) about 7 to 45 percent nutritive carbohydrate sweetener; (3) about 1 to 5 percent ungelatinized starch; (4) about 8 to 60 weight percent water; and (5) edible acid.

SUMMARY OF THE INVENTION

The general object of this invention is to provide an improved storage-stable ready-to-spread cake frosting. A more particular object is to provide such a frosting which, when compared to currently-available ready-to-spread frostings, has: (1) a lower water activity (i.e., is moisture retentive); (2) a reduced level of preservatives; (3) reduced fat; (4) reduced calories; and (5) improved organoleptic properties.

We have invented a storage-stable ready-to-spread cake frosting comprising: (1) about 40 to 85 weight percent sugar, at least about 20 weight percent of which comprises fructose; (2) about 1 to 12 weight percent of a granular starch having a cold-water-solubility of greater than 50 weight percent and a fat content of less than 0.25 weight percent; (3) about 5 to 30 weight percent fat; and (4) about 10 to 30 weight percent water.

This frosting has a low water activity due primarily to its high fructose content. The low water activity makes the frosting resistant to drying and, as a result, the frosting remains moist and soft even weeks after exposure to ambient air. The low water activity also makes the frosting resistant to microbial spoilage and reduces or eliminates the need for preservatives. Certain embodiments of this frosting have low fat levels primarily because the unique properties of the starch permit desirable organoleptic properties to be maintained despite a reduction in fat levels. Certain embodiments of this frosting also have low calories both because of their low fat levels and because fructose is sweeter than other sugars so less is needed for a desired sweetness level. Finally, this frosting has very desirable organoleptic properties. Its texture is extremely smooth and creamy because fructose has less tendency to crystallize than other sugars and because of the unique properties of the starch. The frosting also has a desirable consistency, viscosity, and density.

DETAILED DESCRIPTION OF THE INVENTION

A. The Sugar

The frosting of this invention comprises about 40 to 85, and preferably about 45 to 75, weight percent sugar measured on a dry substance basis. The term "sugar" is used to describe a carbohydrate product of photosynthesis having one, two, or more saccharose groups. In other words, the term is not used as a synonym for sucrose. Subject to the limitation discussed in the following paragraph, sugars suitable for use in the frosting include fructose, glucose (also known as dextrose), sucrose, maltose, honey, invert sugar, and sorbitol. The preferred sugars are fructose, glucose and sucrose because of their high sweetness, low cost, and ready availability. The sugar provides sweetness to the frosting and is primarily responsible for many of the organoleptic properties of the frosting such as texture, consistency, viscosity, density, and taste.

At least about 20 weight percent of the sugar is fructose. The presence of fructose imparts several important properties to the frosting. First, fructose is primarily responsible for the low water activity of the frosting. The frosting generally has a water activity of less than about 0.75 and the water activity decreases as the fructose percentage increases. At fructose percentages greater than about 40 weight percent, water activities are generally less than about 0.71 and, with fructose percentages of greater than 50 weight percent, water activities are generally less than about 0.68. The low water activity means that the frosting loses water slowly and has a reduced tendency to dry out and harden on the cake. The low water activity also means that microbial growth is greatly reduced so that preservatives can be reduced or eliminated if desired. A second important property of fructose is that is has less tendency to crystallize than other sugars so the frosting maintains a smoother texture. A third important property is its very high sweetness. Compared to other sugars, less fructose is needed to obtain a given level of sweetness for the frosting.

The effect of fructose on water activity freedom from crystallization, and sweetness generally increases as the fructose percentage of the sugar increases. Therefore, if, for example, the goal is to minimize water activity, it is desirable to maximize fructose content. However, there are several reasons why blends of fructose and other sugars may be preferred over pure fructose. The first reason is cost. At the present time, pure fructose is available commercially only in relatively small quantities and at a cost much higher than pure glucose or sucrose. In contrast, blends of fructose and glucose known as high-fructose corn syrups prepared by isomerizing high D.E. corn syrups are widely available at a cost less than pure glucose or sucrose. Such high-fructose corn syrups are commercially available at fructose levels of about 42 percent and 55 percent. The second reason for preferring a blend of fructose and another sugar is that it has recently been discovered that blends of fructose and sucrose exhibit synergistic levels of sweetness. See Batterman, U.S. patent application No. 855,540, filed Apr. 23, 1986.

B. The Cranular Cold-Water-Soluble Starch

The frosting of this invention comprises about 1 to 12, and preferably about 2 to 10, weight percent of a granular cold-water-soluble starch which has been alcohol processed as described in Eastman, U.S. Pat. No. 4,465,702, which is incorporated by reference. The starch is characterized by a cold-water-solubility of greater than 50 weight percent, as measured by the test described in Example 1 below, and by a fat content of less than 0.25 weight percent. The high cold-water-solubility of the starch gives it the ability to hydrate in room temperature water and enables the frosting to be blended at ambient temperatures without heating or cooling. Suitable starches include unmodified (i.e., no chemical modification other than the alcohol processing) and modified (e.g., substituted, cross-linked, acid-thinned and oxidized) corn, tapioca, and potato starches.

It is preferred that the granular cold-water-soluble starch comprise an unmodified or lightly-modified corn starch. Unmodified and lightly-modified corn starches which have been alcohol processed exhibit gel strengths of greater than 90 grams as measured by the test described in Example 2 below. This high gel strength enables the starch to form a resilient, cleanly-sliceable gel when blended with an aqueous sugar solution. This gelling ability is believed to play a major role in imparting a very desirable consistency to the frosting even at relatively low fat levels. Unmodified corn starch has the greatest gel strength, making it most preferred for its effect on frosting consistency. Such a starch is Mira-Gel 463 Starch, a commercial product of the A. E. Staley Manufacturing Company. However, this starch has the tendency to undergo syneresis upon storage. Syneresis is a well known characteristic of unmodified starches and involves the release of bound water as the starch polymer chains align. Accordingly, a frosting made with only unmodified cold-water-soluble starch may develop a water layer upon storage. This is not harmful and the water can easily be dispersed with mixing, but, nevertheless, it is undesirable for a ready-to-spread frosting.

A preferred method of reducing or eliminating syneresis in the frosting is to use a blend of an unmodified cold-water-soluble starch and a modified cold-water-soluble starch. The modified starch affects syneresis by interfering with the alignment of starch chains. A preferred modified starch is one which has been substituted and/or cross-linked. Common reagents for substituting are propylene oxide and acetic anhydride and common cross-linking reagents are phosphorus oxychloride and adipic acid. Such a modified starch is Mira-Thik 469 Starch, a common corn starch substituted with propylene oxide and cross-linked with phosphorus oxychloride.

A most preferred granular cold-water-soluble starch component for the frosting of this invention is a blend of about 1 to 5 weight percent of an unmodified corn starch and about 1 to 5 weight percent of a substituted and cross-linked corn starch.

C. Other Ingredients

In addition to the sugar and the granular cold-water-soluble corn starch, the frosting of this invention generally contains other ingredients which add various properties to the frosting. Foremost of these is probably water. The frosting generally contains about 10 to 30, and preferably about 14 to 24, weight percent water. The water may be added separately or as part of other frosting components (e.g., as with a high fructose corn syrup). The primary purpose of the water is to adjust the viscosity of the frosting. Too much water produces a frosting which is too runny and too little water produces an overly-viscous frosting which is difficult to spread.

The frosting also generally contains about 5 to 30 weight percent fat. Suitable fats include vegetable fats, such as shortening and margarine, and animal fats, such as lard and tallow. The preferred fat is vegetable shortening because of its blandness of taste. The fat contributes to a smooth texture for the frosting, but is high in calories (one gram of fat contains approximately 9 calories whereas one gram of protein or carbohydrate each contains approximately 4 calories). Accordingly, it is desirable to minimize the fat level to reduce calories. The frosting of this invention preferably contains about 8 to 18 weight percent fat in comparison to conventional frostings which routinely contain about 18 to 30 weight percent fat.

Corn syrup solids are low intensity sweeteners which contribute stabilizing and bulking properties to the frosting and are generally present in an amount of about 1 to 10 weight percent. Emulsifiers help stabilize the water and fat components and are generally present in an amount of about 0.01 to 5 weight percent. Many commercial fats include emulsifier. Other common frosting ingredients include flavorings and colorings.

As explained above, the frosting of this invention has a relatively low water activity (generally less than 0.75 and preferably less than 0.71) and does not require preservatives to inhibit the growth of yeasts and molds. Preservatives are not necessarily harmful to the frosting, but they do contribute off-flavors and there is a general demand for "natural" foods containing little or no preservatives. Accordingly, it is preferred that the frosting contain essentially no preservatives.

D. Examples

These Examples are illustrative only.

EXAMPLE 1

This Example describes the test used to measure the cold-water-solubility of a starch.

The following equipment is used in the test:
1. Waring Model PB5 Blender equipped with a semi-micro monel metal clip;
2. International Model K Centrifuge or similar;
3. 100 ml centrifuge tubes;
4. Evaporating dish; and
5. Balance.

The test procedure is as follows:
1. Pour 100 ml of distilled water at room temperature into the Waring Blender cup;
2. Turn the blender on slow speed (about 6100 rpm) and add 1.00 g dry substance basis of starch over less than a 15 second period;
3. Stir on high speed (about 13,500 rpm) for 2 minutes;
4. Pour the starch solution/suspension into a 100 ml centrifuge tube and centrifuge at maximum speed (3100 rpm is satisfactory) for 15 minutes;
5. Transfer a 25 ml aliquot of the supernatant to a tared evaporating dish and evaporate on a steam bath to apparent dryness; and
6. Dry in an oven at 110° C. for at least 1 hour and weigh.

The cold-water-solubility of the starch, expressed as weight percent water solubles on a dry substance basis, is then calculated according to the following formula:

Cold-water-solubility (% dsb)=Wt. of solids in 25 ml×4×100

EXAMPLE 2

This Example describes the test used to measure the gel strength of a starch.

The following equipment is used in the test:
1. Voland Stevens LFRA Texture Analyzer with integrated Recorder and one-half inch AOAC spindle;
2. Sunbeam Mixmaster Mixer with 6 inch mixing bowl; and
3. Balance.

The test procedure is as follows:
1. Mix 47.5 g dry substance starch and 150 g isosweet 5500 Syrup (a high fructose corn syrup manufactured and sold by the A. F. Staley Manufacturing Company containing about 77 percent saccharide and having a ratio of fructose to glucose of 55 to 45) for 2 minutes in the mixer at speed #1;
2. Add 450 ml of distilled water at room temperature and continue mixing at speed #1 for 45 to 50 seconds;
3. Mix at speed #6 for 2 minutes;
4. Let the mixture stand at room temperature for 15 minutes;
5. Place the mixing bowl on the texture analyzer and measure the gel strength at the following settings: penetration speed, 1.0 mm per second and penetration distance, 20 min.

EXAMPLE 3

This Example describes the cake frosting formulations tested in Examples 4 and 5.

Ten chocolate cake frostings were prepared and designated "A" through "J". The frostings differed only in their sugar and starch compositions. FIG. 1 shows the formulation of each of the frostings without detailing their respective sugar and starch compositions.

TABLE 1

| Composition of Cake Frostings A through J | |
|---|---|
| Ingredient | Parts by Weight |
| Sugar | 53.6 |
| Water | 18.0 |
| Vegetable Shortening | 13.2 |
| Corn Syrup Solids | 5.6 |
| Cocoa | 4.6 |
| Starch | 4.2 |
| Vanilla | 0.6 |
| Emulsifier | 0.2 |

TABLE 1-continued

| Composition of Cake Frostings A through J | |
|---|---|
| Ingredient | Parts by Weight |
| | 100.0 |

The vegetable shortening was Betricing shortening, a commercial product of Durkee Foods, Cleveland, Ohio. It is a hydrogenated vegetable oil containing about 0.09 weight percent emulsifier.

The corn syrup solids were Star-Dri 35R Corn Syrup Solids, a commercial product of the A. E. Staley Manufacturing Company, Decatur, Illinois. It is prepared by drying a 35 dextrose equivalent (D.E.) corn syrup to a moisture level of about 3.5 weight percent. Its saccharide distribution is as follows: dextrose (glucose), about 14 percent; maltose, about 12 percent; maltotriose, about 11 percent; and higher saccharides, about 63 percent.

The sugar and starch compositions of the ten frostings are shown in Table 2. As an illustration, Frosting A contained 53.6 weight percent sugar, 100 weight percent of which was fructose, and 4.2 weight percent starch; 50 weight percent of which was Mira-Gel 463 starch and the other 50 weight percent of which was Mira-Thik 469 starch.

TABLE 2

| Sugar and Starch Compositions of Cake Frostings A through J | | | | | | | | | | |
|---|---|---|---|---|---|---|---|---|---|---|
| | A | B | C | D | E | F | G | H | I | J |
| Sugar Composition (%) | | | | | | | | | | |
| Fructose | 100 | 55 | 50 | 41 | 28 | 14 | 0 | 55 | 55 | 55 |
| Glucose | 0 | 45 | 0 | 34 | 22 | 11 | 0 | 45 | 45 | 45 |
| Sucrose | 0 | 0 | 50 | 25 | 50 | 75 | 100 | 0 | 0 | 0 |
| Starch Composition (%) | | | | | | | | | | |
| Mira-Gel 463 | 50 | 50 | 50 | 50 | 50 | 50 | 50 | 0 | 0 | 0 |
| Mira-Thik 469 | 50 | 50 | 50 | 50 | 50 | 50 | 50 | 0 | 0 | 0 |
| PFP | 0 | 0 | 0 | 0 | 0 | 0 | 0 | 100 | 0 | 0 |
| Gelatinized Dura-Jel | 0 | 0 | 0 | 0 | 0 | 0 | 0 | 0 | 100 | 0 |
| Starco 447 | 0 | 0 | 0 | 0 | 0 | 0 | 0 | 0 | 0 | 100 |

The five different types of starches used in the frosting formulations are commercial products of the A. E. Staley Manufacturing Company, Decatur, Ill. Mira-Gel 463 starch is an unmodified cold-water-soluble granular corn starch. Mira-Thik 469 starch is a cold-water-soluble granular corn starch which has been substituted with propylene oxide and cross-linked with phosphorus oxychloride. PFP ("Pure Food Powdered") starch is an unmodified granular non-cold-water soluble corn starch. Gelatinized Dura-Jel starch is a pregelatinized (i.e. non-granular) waxy corn starch substituted with propylene oxide and cross-linked with phosphorus oxychloride. Starco 447 starch is a pregelatinized tapioca starch substituted with propylene oxide and cross-linked with phosphorus oxychloride.

EXAMPLE 4

This Example illustrates the effect of sugar composition on moisture loss from, and water activity of, a cake frosting.

Frostings A through G from Example 3, which differed only in sugar composition, were tested for moisture loss and water activity immediately after preparation. The moisture loss test was as follows. An 8.0 gram sample of each frosting was placed on a rack in a sealed container containing an aqueous salt solution at room temperature so that the relative humidity inside the container was a constant 43 percent. The samples were then weighed periodically to determine the amount of moisture loss. The results are shown in Table 3 where moisture loss is expressed in terms of weight percentage based on the initial weight of the water.

The water activity test used a Dew-All Model 911 Digital Humidity Analyzer. The Analyzer measured the relative humidity of the air in equilibrium with each frosting and these readings were then compared to the humidity readings of aqueous salt solution standards having known water activities. The results are also shown in Table 3.

TABLE 3

| Effect of Sugar Composition on Water Activity and Moisture Loss | | | | | | | | | | | | | | | |
|---|---|---|---|---|---|---|---|---|---|---|---|---|---|---|---|
| Frosting Designation | Water Activity | Percentage Moisture Loss with Time (Hours) | | | | | | | | | | | | | |
| | | 1 | 2 | 3 | 4 | 5 | 6 | 7 | 8 | 24 | 26 | 28 | 30 | 32 | 34 |
| A (100% fructose) | 0.66 | 1.4 | 2.4 | 3.4 | 4.3 | 5.5 | 6.1 | 6.8 | 7.6 | 14.6 | 15.8 | 16.9 | 17.7 | 18.5 | 19.5 |
| B (55% fructose, 45% glucose) | 0.66 | 1.6 | 2.8 | 3.8 | 4.8 | 6.1 | 6.9 | 7.6 | 8.6 | 18.6 | 19.8 | 20.4 | 21.0 | 21.8 | 22.7 |
| C (50% fructose, 50% sucrose) | 0.68 | 1.9 | 3.6 | 5.0 | 6.3 | 7.6 | 8.6 | 9.6 | 10.2 | 18.6 | 19.9 | 20.6 | 21.4 | 22.1 | 23.2 |
| D (41% fructose, 34% glucose, 25% sucrose) | 0.71 | 2.2 | 3.8 | 4.8 | 5.9 | 7.6 | 8.3 | 9.8 | 9.9 | 19.6 | 20.6 | 21.3 | 21.8 | 22.4 | 23.1 |
| E (28% fructose, 22% glucose, 50% sucrose) | 0.73 | 2.4 | 4.1 | 5.5 | 6.7 | 8.2 | 9.3 | 10.4 | 11.0 | 21.2 | 22.1 | 22.6 | 23.2 | 23.8 | 24.7 |
| F (14% fructose, 11% glucose, 75% sucrose) | 0.78 | 2.6 | 5.1 | 7.4 | 9.2 | 11.6 | 13.0 | 14.4 | 15.5 | 29.6 | 30.9 | 31.6 | 32.3 | 33.1 | 34.4 |
| G (100% sucrose) | 0.82 | 5.5 | 9.0 | 12.3 | 14.8 | 17.8 | 19.2 | 20.6 | 21.7 | 34.3 | 35.3 | 35.9 | 36.4 | 37.3 | 38.2 |

The results show that water activity and moisture loss decreased as fructose content increased. A comparison of Frosting B (55% fructose, 45% glucose) and Frosting C (50% fructose, 50% sucrose) shows that the identity of the non-fructose sugar has little effect on water activity or moisture loss.

EXAMPLE 5

This Example illustrates the effect of starch composition on the organoleptic properties of a cake frosting.

Frostings B, H, I and J from Example 3, which differed only in starch composition, were ingested by a taste panel whose subjective comments were noted.

Frosting B, which contained the granular cold-water-soluble starches, had superior organoleptic properties. It had an extremely smooth and creamy texture despite its relatively low level of fat and its consistency, viscosity, and density were very desirable. It also had an excellent appearance and taste.

Frosting H, which contained the non-cold-water-soluble starch, had an unacceptable viscosity because it was too runny. The starch neither hydrated nor dissolved during the room temperature preparation of the frosting and, therefore, made little contribution to the frosting's physical properties.

Frostings I and J, which contained pregelatinized non-granular starches, had undesirable, spongy mouthfeels.

The results show that a granular cold-water-soluble starch is necessary to produce a low-fat cake frosting with satisfactory organoleptic properties.

We claim:

1. A storage-stable ready-to-spread cake frosting comprising:
   (a) about 40 to 85 weight percent sugar, at least about 20 weight percent of which comprises fructose;
   (b) about 1 to 12 weight percent of a granular starch having a cold-water-solubility of greater than 50 weight percent and a fat content of less than 0.25 weight percent;
   (c) about 5 to 30 weight percent fat; and
   (d) about 10 to 30 weight percent water.

2. The frosting of claim 1 wherein the starch comprises a corn starch having a gel strength of greater than 90 grams.

3. The frosting of claim 2 wherein the sugar is selected from the group consisting of fructose, glucose and sucrose.

4. The frosting of claim 3 having a water activity of less than about 0.75.

5. The frosting of claim 4 comprising about 45 to 75 weight percent sugar, at least about 40 weight percent of which comprises fructose.

6. The frosting of claim 5 comprising about 8 to 18 weight percent fat.

7. The frosting of claim 6 having a water activity of less than about 0.71.

8. The frosting of claim 7 additionally comprising about 1 to 10 weight percent corn syrup solids and about 0.01 to 5 weight percent emulsifier.

9. The frosting of claim 8 comprising essentially no preservatives.

10. The frosting of claim 9 wherein the starch consists essentially of about 1 to 5 weight percent by weight of said frosting of an unmodified starch and about 1 to 5 weight percent by weight of said frosting of a substituted and crosslinked starch.

11. The frosting of claim 1 comprising about 5 to 18 weight percent fat.

12. The frosting of claim 1 comprising about 8 to 18 weight percent fat.

13. The frosting of claim 1 wherein the starch comprises of a blend of an unmodified cold-water-soluble starch and a modified cold-water-soluble starch.

14. The frosting of claim 13 wherein the weight ratio of unmodified cold-water-soluble starch to modified cold-water-soluble starch ranges from about 1:5 to about 5:1.

15. The frosting of claim 13 wherein the modified cold-water-soluble starch is a substituted and crosslinked starch.

16. The frosting of claim 15 wherein the modified cold-water-soluble starch is substituted with propylene oxide and crosslinked with phophorous oxychloride.

17. The frosting of claim 1 comprising about 45 to 75 weight percent sugar, at least about 40 weight percent of which comprises fructose, said frosting having a water activity of less than about 0.71.

18. The frosting of claim 17 wherein at least about 50 weight percent of the sugar is comprised of fructose and the water activity is less than about 0.68.

19. The frosting of claim 1 wherein the fat comprises from about 8 to 18 weight percent of the frosting and the starch consists essentially of a blend of an unmodified cold-water-soluble starch and a modified cold-water-soluble starch.

* * * * *